United States Patent [19]

Ristimäki

[11] Patent Number: 4,719,780

[45] Date of Patent: Jan. 19, 1988

[54] TOOL POINT AND ITS WORKING METHOD AND TOOL FOR MAKING AND FLANGING A HOLE

[75] Inventor: Pekka Ristimäki, Laihia, Finland

[73] Assignee: G.A. Serlachius Corp., Laihia, Finland

[21] Appl. No.: 881,082

[22] Filed: Jul. 2, 1986

[30] Foreign Application Priority Data

Oct. 4, 1985 [FI] Finland ............................ 853850

[51] Int. Cl.⁴ .................................... B21D 19/00
[52] U.S. Cl. ........................................ 72/71; 72/126; 72/325
[58] Field of Search ................... 72/70, 71, 115, 117, 72/325, 406, 476, 479, 126, 124, 125; 29/157 T

[56] References Cited

U.S. PATENT DOCUMENTS

| | | | |
|---|---|---|---|
| 3,151,657 | 10/1964 | Beranek | 29/157 T |
| 3,670,547 | 6/1972 | Granger | 72/123 |
| 3,683,657 | 8/1972 | Davies | 72/479 |
| 3,812,698 | 5/1974 | Stock | 72/71 |
| 3,844,149 | 10/1974 | Hansen | 72/71 |
| 3,882,707 | 5/1975 | Rothenberger | 72/117 |

FOREIGN PATENT DOCUMENTS

| | | | |
|---|---|---|---|
| 1527828 | 6/1970 | Fed. Rep. of Germany | 72/117 |
| 2434498 | 2/1975 | Fed. Rep. of Germany | 72/325 |
| 2456160 | 6/1975 | Fed. Rep. of Germany | 72/325 |
| 1931897 | 9/1977 | Fed. Rep. of Germany | 72/117 |
| 137472 | 10/1979 | Japan | 72/117 |
| 253229 | 6/1926 | United Kingdom | 72/325 |
| 1455276 | 11/1976 | United Kingdom | 72/325 |
| 464357 | 3/1975 | U.S.S.R. | 72/342 |
| 473542 | 6/1975 | U.S.S.R. | 72/71 |

Primary Examiner—Lowell A. Larson
Attorney, Agent, or Firm—Bernard, Rothwell & Brown

[57] ABSTRACT

The invention relates to a tool point as well as to a method and device for making a pipe joint flange in sheet material, like in the wall of a pipe. The tool point is provided with a hole-working bit member and a flanging surface is provided by the lower face of a recess thereabove or by the top surface of a chamfer. During the drilling of a hole, a certain axis of the hole-working means is brought to coincide with the axis of rotation of said tool point. When the hole working is finished, the tool point is shifted relative to the axis of rotation so as to move said axis of the hole-working means away from the axis of rotation, said flanging surface thus moving below the rim of a hole. When the tool point is then rotated in this radially displaced position while simultaneously pulling it out of the hole, the flanging surface pulls the hole rims upwards to form a flange. A single-component tool point is simple and sturdy and can, therefore, be used for flanging thick sheets.

9 Claims, 9 Drawing Figures

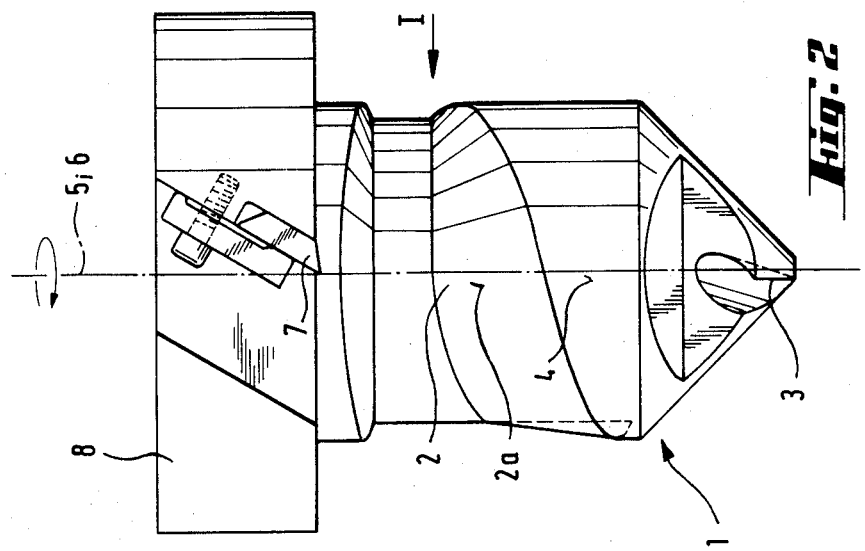
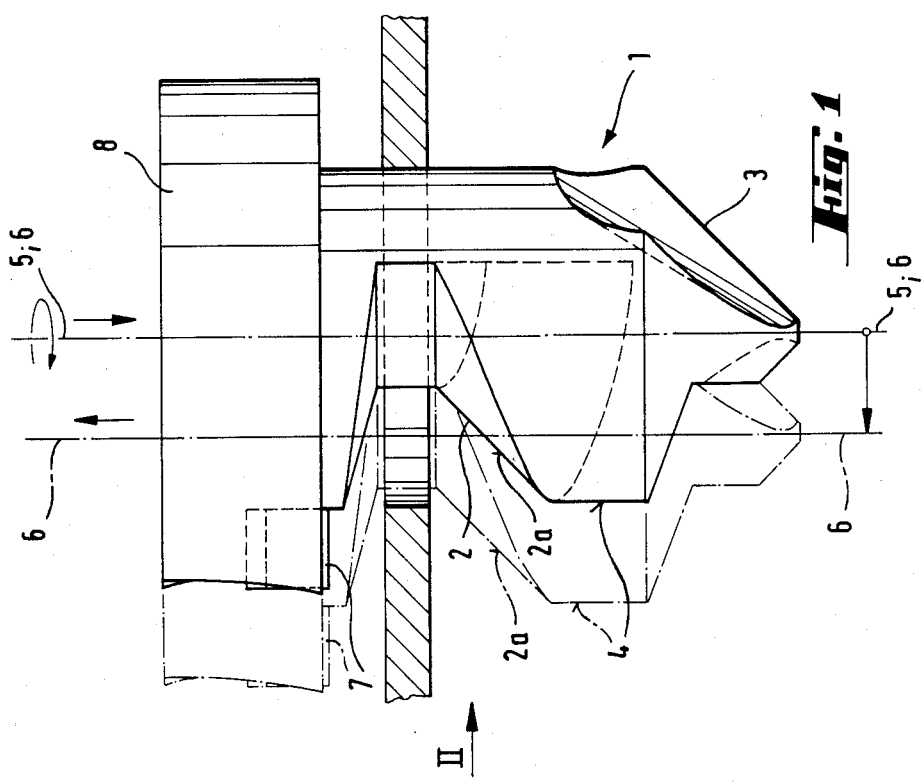

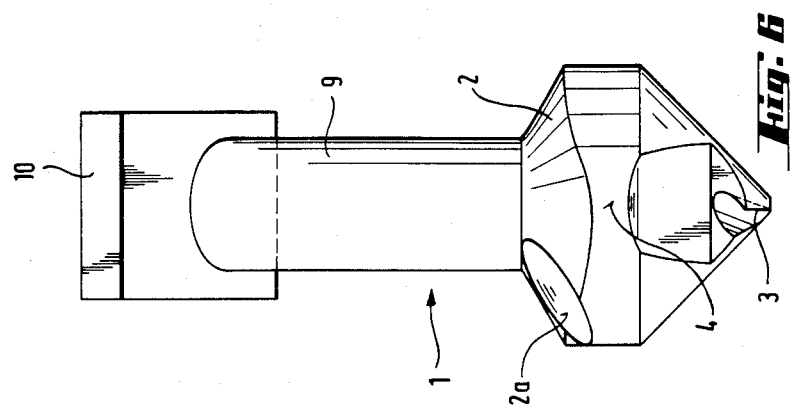
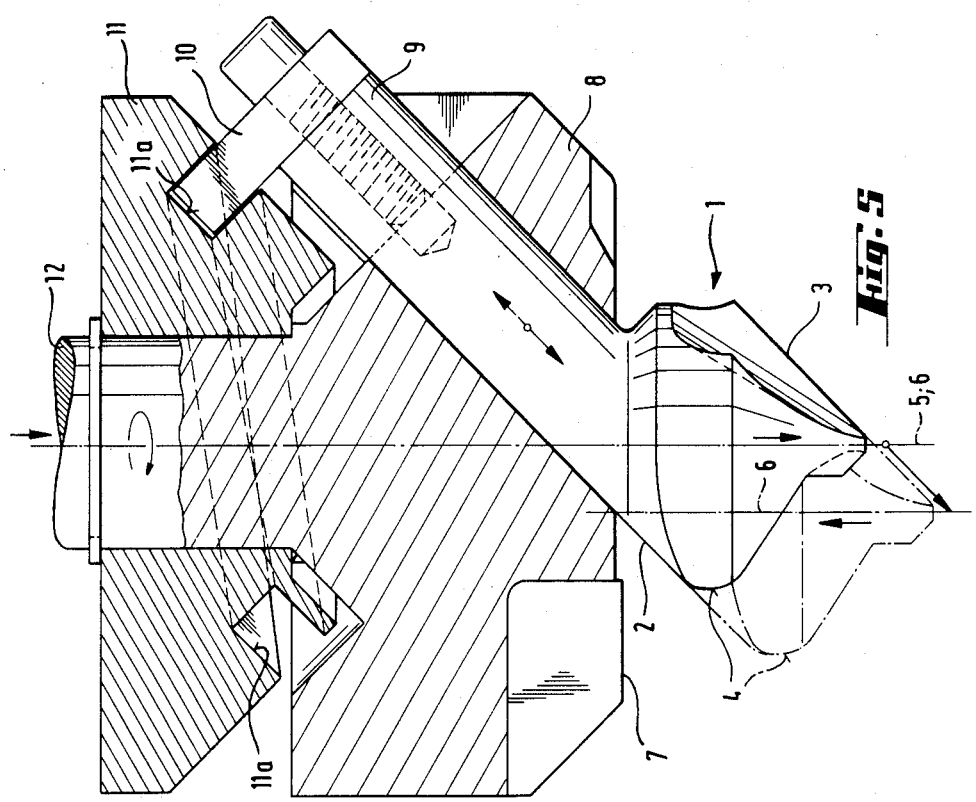

TOOL POINT AND ITS WORKING METHOD AND TOOL FOR MAKING AND FLANGING A HOLE

The present invention relates to a tool point for making and flanging a hole, said tool point comprising a hole working bit member and a flanging means thereabove for making a flange or collar after finishing the hole.

The invention relates also to a method of making a pipe joint flange in sheet material, such as in the wall of a pipe by using such a tool point, the method including the following working steps:

- working a hole in sheet material by rotating the tool point around the center axis of the hole
- maintaining the tool point, together with its hole working means and flanging means, during the hole machining in a first position relative to the axis of rotation coinciding with the hole center axis
- the flanging means is positioned below the hole rim
- pulling the hole working means together with its flanging means out of the hole while rotating the tool point around the hole center axis, the hole rims being pulled upwards so as to form a flange. The invention relates further to a tool for practicing the method, said tool point comprising a hole working bit member and a flanging means thereabove for making a flange after finishing the hole.

U.S. Pat. No. 3,592,038 discloses a tool point, wherein two dowel-like flanging members extend crosswise through a drill, a rotatable control means being operable for pulling said flanging members inside the jacket surface of a drill during the drilling and for pushing them outside the jacket surface of a drill below the hole rims for flanging action. This tool point has proven highly effective and useful for most practical flanging requirements. However, the fact that there are two flanging dowels extending through a drill sets certain limitations to the thickness of flanging dowels and to the strength of a drill at the intersection of dowels. If the dowel thickness is increased for increased strength and area of flanging surface, the drill rod weakens at the intersection of dowels and, thus, it is necessary to settle with certain optimum dimensions in terms of the dowel thickness and drill rod strength. These optimum dimensions do not result in a tool point sufficiently strong for all prevailing flanging requirements, e.g. flanging of a rather thick wall made of stainless steel.

An object of the invention is to provide a novel type of tool point which is suitable both for making and flanging a hole and which can be made of such strength that it can also be used for flanging major wall thicknesses. In order to accomplish this object, the flanging means of a tool point of the invention is provided by a surface, designed to the tool point and fixedly carried thereby in radial direction, said surface being located inside the diametral rim of a hole circumscribed by a hole working bit member as it rotates around its axis. Such a tool point is made of a single element and thus its design is simple.

According to a method of the invention, the tool point is operated in a manner that, for a flanging operation effected after the hole is finished, a flanging means is brought below the hole rim by shifting the tool point, together with its hole working means and flanging means, from said first position to a second position relative to said axis of rotation, said shifting of a tool point being effected in a direction that has a radially directed component. In other words, a certain axis of the hole making means is shifted to another position for the flanging step and during the flanging step said axis of hole making means is driven around the axis of rotation.

Sometimes there may occur a situation that e.g. the pipe walls restrict shifting of a tool point directly to a flanging position. This problem can be overcome by rotating a tool point around an axis of rotation coinciding with the center axis of said hole while, at the same time, the tool point is shifted from said first position to a second position relative to the axis of rotation.

A tool intended for carrying out the method is characterized in that a tool point is fastended to elements for shifting said tool point with its hole making and flanging means relative to the axis of rotation from a first position to a second position, the flanging surface extending in the second position further away from the axis of rotation than in the first position.

As for a tool itself, it is possible to cite U.S. Pat. Nos. 3,714,808 and 3,884,060 as prior art. In each of these cases, the tool point used is the one disclosed in U.S. Pat. No. 3,5982,038. Furthermore, U.S. Pat. No. 4,414,835 discloses a tool fitted with a tool point set forth in U.S. Pat. No. 4,413,485. What is common between this prior art and the invention is that in both cases a tool point is provided with means for both making and flanging a hole.

The invention will now be described by way of some embodiments with reference made to the accompanying drawings, in which FIG. 1 shows a tool point according to a first embodiment of the invention in side view and FIG. 2 shows the same turned through 90°.

FIG. 5 shows a tool point according to a third embodiment of the invention attached to a device for shifting the tool point between drilling position and flanging position.

FIG. 6 shows the tool point of FIG. 5 from the side of the flanging surface.

Figure 4:
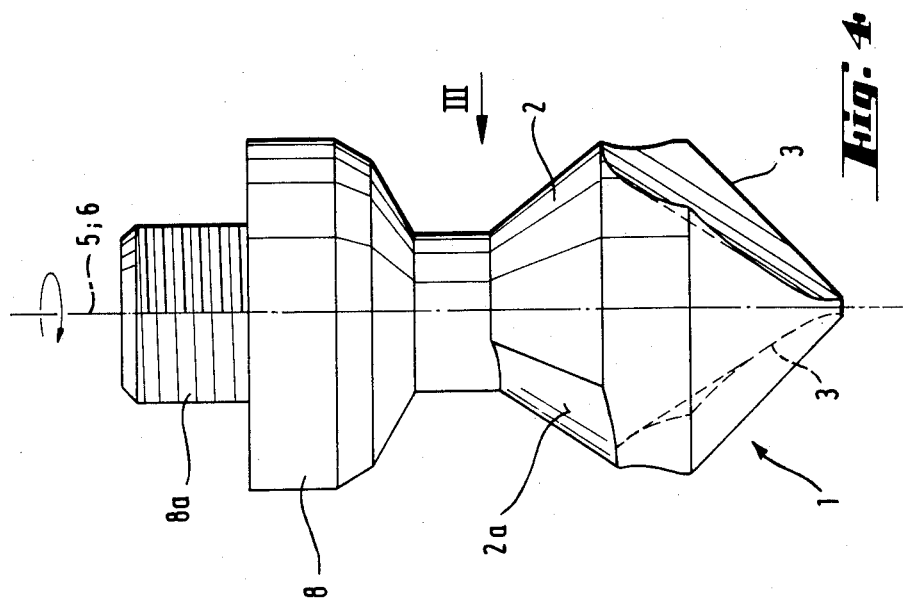
FIG. 3 shows a tool point according to a second embodiment of the invention in side view and FIG. 4 shows the same turned through 90°.

A tool point as shown in FIGS. 1 and 2 comprises a drilllike bit member 3, a rod member thereabove being provided with a recess whose lower face 2 serves as a flanging surface. In the present case, said surface 2 extends in radial direction circa 180° and is directed obliquely upwards from the outer shell towards center axis 5. The flanging surface 2 has preferably a helical pitch, the lower initial surface section 2a forming a prebending section. An element that builds up a hole-forming bit member 3 and flanging surface 2 is connected to an attachement member 8, comprising elements, not shown in detail, for fastening the tool point to an actual tool and drive means.

The tool point is operated as follows. A tool or implement drives a point 1 during both making and flanging of a hole around an axis of rotation 5. During the making of a hole, the axis 6 of a hole-forming means 3, which coincides with the center axis of a hole to be made, coincides with the axis of rotation 5. Thus, a hole can be drilled in a wall to be flanged, since the flanging surface 2 lies inside the diametral rim of a hole circumscribed by a hole-working bit member 3 as it rotates. After a hole is drilled, said tool point is shifted to a position shown by dot-dash lines, the hole-forming axis 6 of tool point moves away from the axis of rotation 5 and flanging surface 2 moves below the hole rim. Rotation is continued around axis 5 while at the same time pulling tool point 1 out of the hole. Thus, surface 2 pulls the hole rim up to form a flange. Between the lower edge of surface 2 and said hole-forming means 3 lies a calibration section 4 which, depending on the shifting distance between axes 5 and 6, defines the inner diameter of a flange to be built. When a flange has been pulled up, the top edge of said flange can be trimmed by means of a trimming tool 7, still rotating tool point 1 in the flanging position while effecting an axial feeding movement downwards.

Said flanging surface 2 and the cutting edge of drill 3 are located on the opposite sides of center axis 6. Instead of a drill, said hole-forming means 3 can be e.g. an annular saw (see U.S. Pat. No. 3,714,808) or a cutter.

Figure 3:
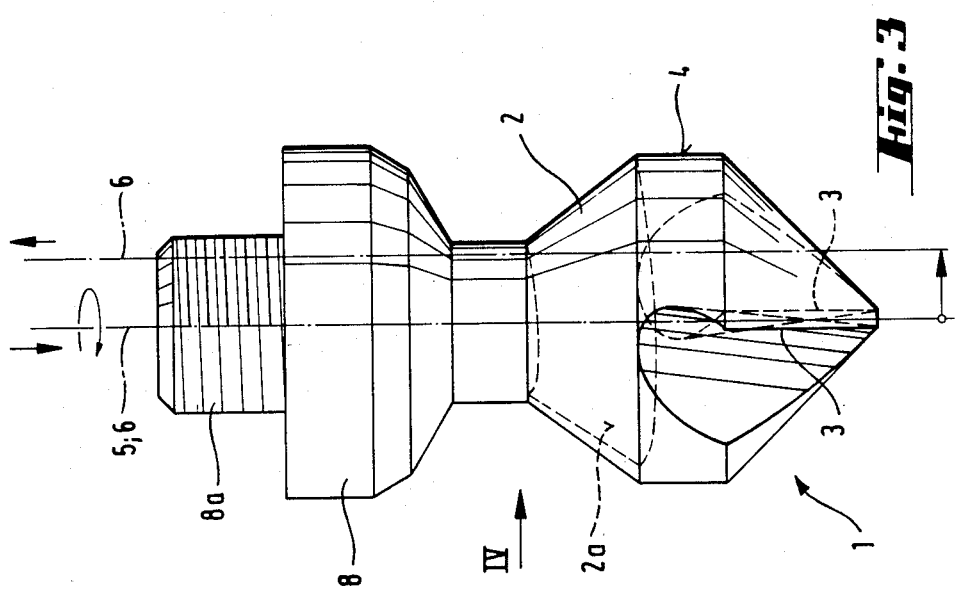

The embodiment shown in FIGS. 3 and 4 differs from the one described above in that the flanging surface 2 is made as the bottom surface of an annular groove surrounding the drill axis. Even in this case, the section of surface 2 participating in the flanging action can be provided with a helical screw pitch so as to form an axially lower prebending section 2a. An attachment element 8 is provided with a pilot tap 8a for connecting the tool point to an actual tool. In FIG. 3, reference numeral 5 indicates the positions of axis of rotation during drilling and flanging. In practice, said axis of rotation 5 holds still and flanging point 1 is shifted relative thereto. Flanging point 1 can, in principle, be also used in a manner that the axis of rotation 5 and a workpiece to be flanged are both shifted relative to flanging point 1 but the practical arrangement of this is difficult. In this case, it is also possible to rotate tool point 1 during the flanging action around its own axis while driving this axis around the axis of rotation 5.

In the embodiment shown in FIGS. 5 and 6, said flanging surface 2 is made as the top surface of a chamfer designed on tool point 1. A drill bit 3 is connected to a dowel 9 inclined relative to axis of rotation 5 and drill axis 6 and extended through an inclined aperture in an attachment element 8. The top end of dowel 9 is provided with a lug 10 engaged in a groove 11a on the conical face of an adjustment member 11. Groove 11a has a helical pitch and adjustment member 11 is rotatable around an axis 12 for shifting tool point 1 between drilling position and flanging position by turning said adjustment member 11. In drilling position, said drill axis 6 coincides with axis of rotation 5 and in flanging position said drill axis 6 moves away from axis of rotation 5. When tool point 1 is shifted to flanging position, said flanging surface 2 extends below the hole rims. As rotation is continued around axis 5 and flanging point 1 is pulled out of the hole in the direction of axis 5, the flanging will be effected. The edge of a flange can be trimmed by means of a trimming tool 7 by carrying on the rotation of attachment element 8 and by shifting it downwards in the direction of axis 5.

Figure 7:
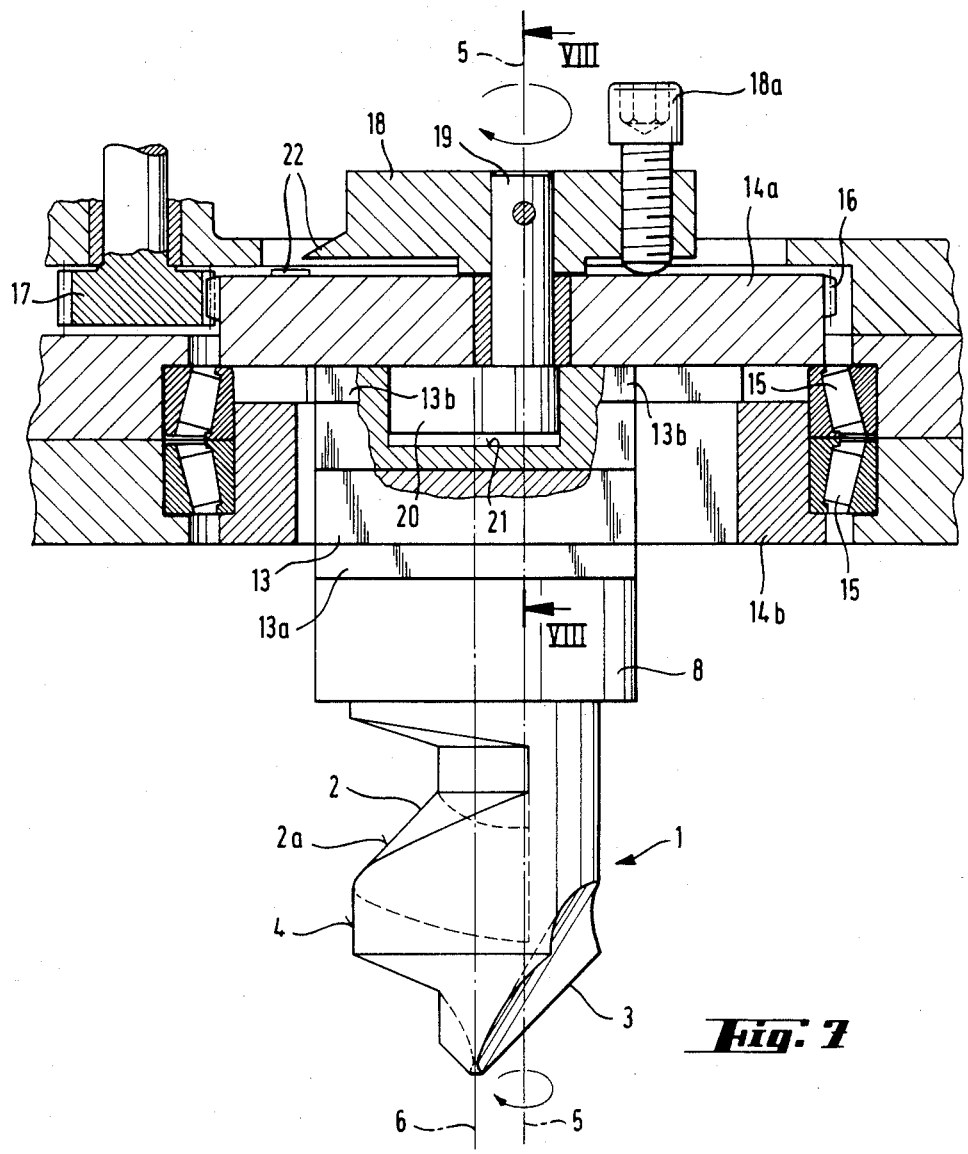
FIG. 7 shows the flanging bit of FIG. 1 attached to elements for shifting said flanging bit between drilling position and flanging position.
Figure 8:
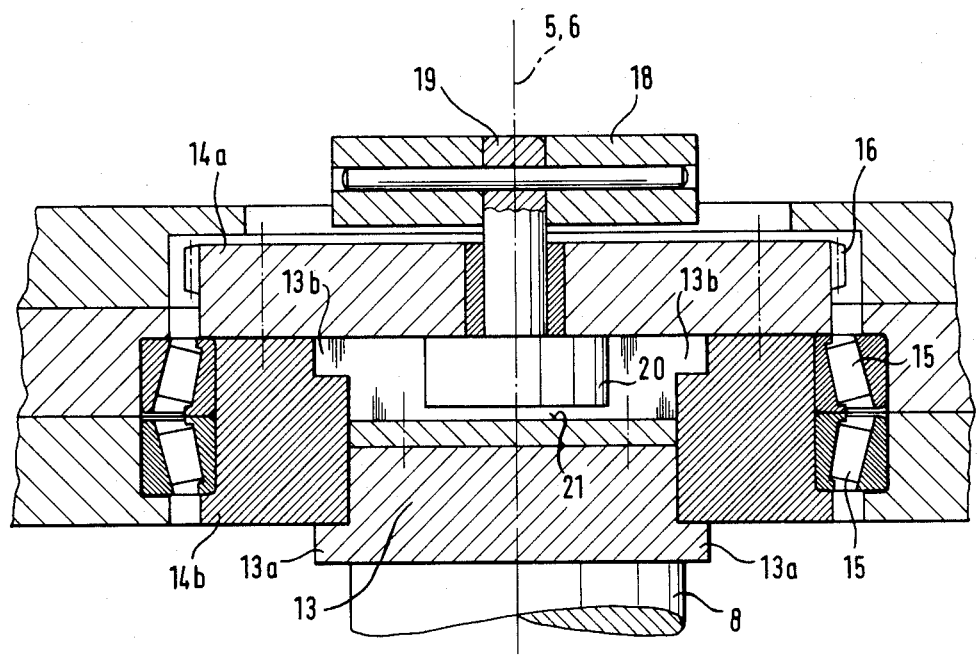
FIG. 8 is a section taken along line VIII—VIII in FIG. 7.

FIGS. 7 and 8 show the elements for shifting a tool point between drilling position and flanging position. An attachment element 8 is secured to a slide member 13 which, by means of flanges 13a and 13b, is in sliding engagement with an element 14a, 14b. Element 14a, 14b is in turn made rotatable relative to the main body by means of bearings 15. For rotation, said element 14a is surrounded by a tooth rim 16, meshed with a drive gear 17. On the center axis of element 14a is journalled a shaft 19 whose top end is fitted with a control wheel 18 and bottom end with an eccentric cam 20 located in a groove 21 in said slide member 13. As control wheel 18 is rotated, said cam member 20 moves slide member 13 and a tool point 1 carried thereby from right to left and vice versa in FIG. 7. In the situation shown in FIG. 7, the drill axis 6 has already moved a short distance from the axis of rotation 5, i.e. the tool point is in flanging position. By means of a lock screw 18a, said control wheel 8 and thus the tool point 1 can be locked in a desired flanging position after the hole working is finished.

Figure 9:
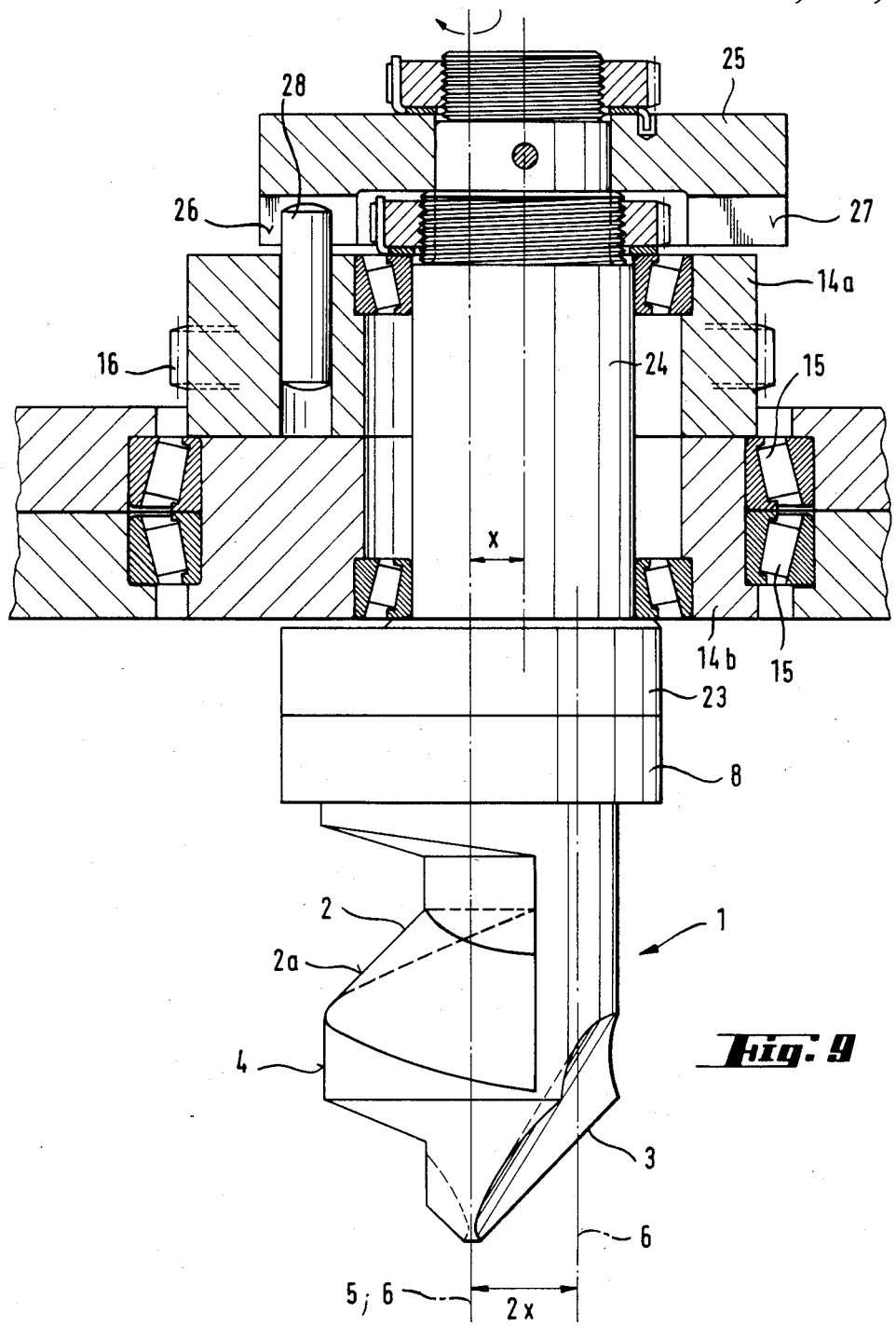
FIG. 9 shows the flanging bit of FIG. 1 attached to a second embodiment of a device for shifting the flanging bit between drilling position and flanging position.

FIG. 9 depicts another way of shifting a tool point between drilling position and flanging position. Reference numerals 14a, 14b, 15 and 16 designate components whose function is substantially the same as that of the components indicated with the same reference numerals in FIG. 7. An attachment element 8 is mounted by way of an element 23 on a shaft 24, positioned eccentrically (displaced by distance x) relative to the axis 6 of tool point 1. To the top end of eccentric shaft 24 is fastened a control wheel 25 whose bottom surface is provided with a fixed limit stop 26 and a circumferentially displaceable limit stop 27 that can be locked in a desired position. A limit pin 28 in element 14a extends to the circumferential section between limit stops 26 and 27. When said fixed limit stop 26 meets pin 28, the axis 6 of tool point 1 coincides with axis of rotation 5 which means that the tool point is in hole-drilling position. When said control wheel 25 is turned, shaft 24 rotates together with the tool point 1 mounted thereon around the center axis of shaft 24. Thus, the axis 6 of tool point 1 moves away from axis of rotation 5. The adjustable stop 27 limits the distance of displacement between axes 5 and 6. The maximum distance of this displacement is 2·x obtained by turning control wheel 25 through 180°. By means of a reversible drive means it is possible to effect the displacement between drilling position and flanging position merely by reversing the direction of rotation.

The application of a tool point of the invention is not limited to the above embodiments. When flanging smaller workpieces it is possible to hold a tool point fixedly in position, a workpiece fastening table being made rotatable, displaceable in the direction of the axis of rotation and also displaceable in the direction perpendicular to the axis of rotation. Provision of NC-control for controlling these movements is a task that can be accomplished by modern technology.

I claim:

1. A tool point for making and flanging a hole, said tool point (1) comprising a hole-cutting bit member (3) and thereabove a flanging portion for producing a flange in a hole formed by said hole-cutting bit member, characterized in that said flanging portion comprises a surface (2) designed on the tool point and extending thereon in a radial direction, said surface being located inside the diametral rim of said hole-cutting bit member (3) as it rotates around its axis.

2. A tool point as set forth in claim 1, characterized in that said flanging surface (2) designed on the tool point is directed from said diametral rim obliquely upwards towards the center axis of said diametral rim and extends also a substantial distance in circumferential direction.

3. A tool point as set forth in claim 2, characterized in that said flanging surface (2) extends in circumferential direction more than 90°, preferably circa 180° or 360°.

4. A tool point as set forth in any of claims 1, 2 or 3, characterized in that said flanging surface (2) is the lower face of a recess made in the tool point or the top surface of a chamfer.

5. A tool point as set forth in claim 4, characterized in that said flanging surface (2) is provided with a helical pitch.

6. A method of making a pipe joint flange in sheet material like in the wall of a pipe, said method employing a tool point of claim 1 and comprising the following working steps:
cutting a hole in sheet material by rotating a tool point on the center axis of said hole
maintaining the tool point, together with its hole-cutting bit member and flanging portion, during the hole-cutting action in a first position relative to the center axis of said hole (5) coinciding with the axis of rotation (6) of said tool point
bringing the flanging portion below the hole rim, shifting the tool point, together with its hole-cutting bit member and flanging portion, from said first position to a second position relative to the center axis of said hole, said shifting of the tool point being effected in a direction that has a radial component to position said flanging portion beneath the hole rim, and pulling the hole cutting bit member with its flanging portion out of the hole while rotating the tool point around the hole center axis, the rim of said hole thus being pulled upwards to form a flange.

7. A method as set forth in claim 6, wherein the axis (6) of the hole-cutting bit member is brought to coincide with the hole center axis (5) during the hole-cutting operation characterized in that said axis (6) of the hole cutting bit member is shifted to another position relative to the center axis of said hole (5) for forming said flange, and while forming said flange the hole-cutting bit member is rotated around the center axis of said hole (5).

8. A method as set forth in claim 6, characterized in that said tool point is rotated around the center axis of said hole while simultaneously shifting tool point (1) from said first position to a second position relative to the center axis of said hole.

9. A tool for carrying out the method of claim 6, said tool comprising a tool point (1) comprising a hole-cutting bit member (3), means for rotating the tool point, means for moving a flanging portion thereof below the rim of a hole and means for shifting the tool point in the direction of an axis of rotation (5) simultaneously with rotational drive, characterized in that said tool point (1) is secured to elements (8, 10, 11, 13, 14, 18-21; 23-28) for shifting the tool point with its hole-cutting bit member and flanging portion (3 and 2) relative to the center axis of said hole (5) from a first position to a second position, said flanging surface (2) extending further away from the center axis of said hole (5) in the second position than in the first position.

* * * * *